United States Patent
Weber et al.

(10) Patent No.: US 7,155,537 B1
(45) Date of Patent: Dec. 26, 2006

(54) INFINIBAND ISOLATION BRIDGE MERGED WITH ARCHITECTURE OF AN INFINIBAND TRANSLATION BRIDGE

(75) Inventors: Bret S. Weber, Wichita, KS (US); Russell J. Henry, Wichita, KS (US); Dennis E. Gates, Wichita, KS (US); Keith W. Holt, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 731 days.

(21) Appl. No.: 09/965,292

(22) Filed: Sep. 27, 2001

(51) Int. Cl.
*G06F 15/16* (2006.01)
*G06F 15/167* (2006.01)
*G06F 13/36* (2006.01)

(52) U.S. Cl. ............... 709/249; 709/212; 710/306

(58) Field of Classification Search ........... 709/218, 709/249, 212, 213; 710/306–315; 711/111–114
See application file for complete search history.

(56) References Cited

U.S. PATENT DOCUMENTS

| | | | | |
|---|---|---|---|---|
| 4,428,043 A * | 1/1984 | Catiller et al. | ............. | 709/250 |
| 5,309,437 A * | 5/1994 | Perlman et al. | ............. | 370/401 |
| 5,317,739 A * | 5/1994 | Elko et al. | ................. | 709/216 |
| 5,333,277 A * | 7/1994 | Searls | ...................... | 710/300 |
| 5,390,173 A * | 2/1995 | Spinney et al. | ............. | 370/393 |
| 5,444,851 A * | 8/1995 | Woest | ...................... | 709/222 |
| 5,619,642 A * | 4/1997 | Nielson et al. | ............. | 714/6 |
| 6,178,171 B1 * | 1/2001 | Alexander et al. | .... | 370/395.54 |
| 6,272,127 B1 * | 8/2001 | Golden et al. | ............. | 370/352 |
| 6,286,006 B1 * | 9/2001 | Bharat et al. | ............... | 707/100 |
| 6,434,627 B1 * | 8/2002 | Millet et al. | ............... | 709/245 |
| 6,594,712 B1 * | 7/2003 | Pettey et al. | ................ | 710/22 |
| 6,611,883 B1 * | 8/2003 | Avery | .......................... | 710/22 |
| 6,658,521 B1 * | 12/2003 | Biran et al. | ................. | 710/315 |
| 6,662,230 B1 * | 12/2003 | Eichstaedt et al. | ......... | 709/229 |
| 6,754,219 B1 * | 6/2004 | Cain et al. | .................. | 370/401 |
| 2002/0120706 A1 * | 8/2002 | Murphy | .................... | 709/208 |
| 2002/0124148 A1 * | 9/2002 | Beukema et al. | .......... | 711/163 |
| 2002/0172195 A1 * | 11/2002 | Pekkala et al. | ............ | 370/360 |
| 2003/0014544 A1 * | 1/2003 | Pettey | ........................ | 709/249 |

* cited by examiner

*Primary Examiner*—Andrew Caldwell
*Assistant Examiner*—Michael D. Meucci
(74) *Attorney, Agent, or Firm*—Yee & Associates

(57) ABSTRACT

A method and system for facilitating communication between computer subnets are provided. One embodiment of the present invention comprises presetting buffers in an internal subnet, wherein the buffers help route external commands to a plurality of devices within the internal subnet. When a command from an external subnet is received by the internal subnet, the command is translated and sent to the proper internal device, as determined by the buffers. The command is then performed by the proper internal device. In another embodiment of the present invention, translation mapping are established for the internal subnet. When a command is received from an external subnet, the destination address associated with the command is translated to the address of the appropriate internal device, and the command is then sent directly to the internal device, which performs the command. By using either the buffer or translation mappings, the internal subnet appears to be a single device to the external subnet.

8 Claims, 6 Drawing Sheets

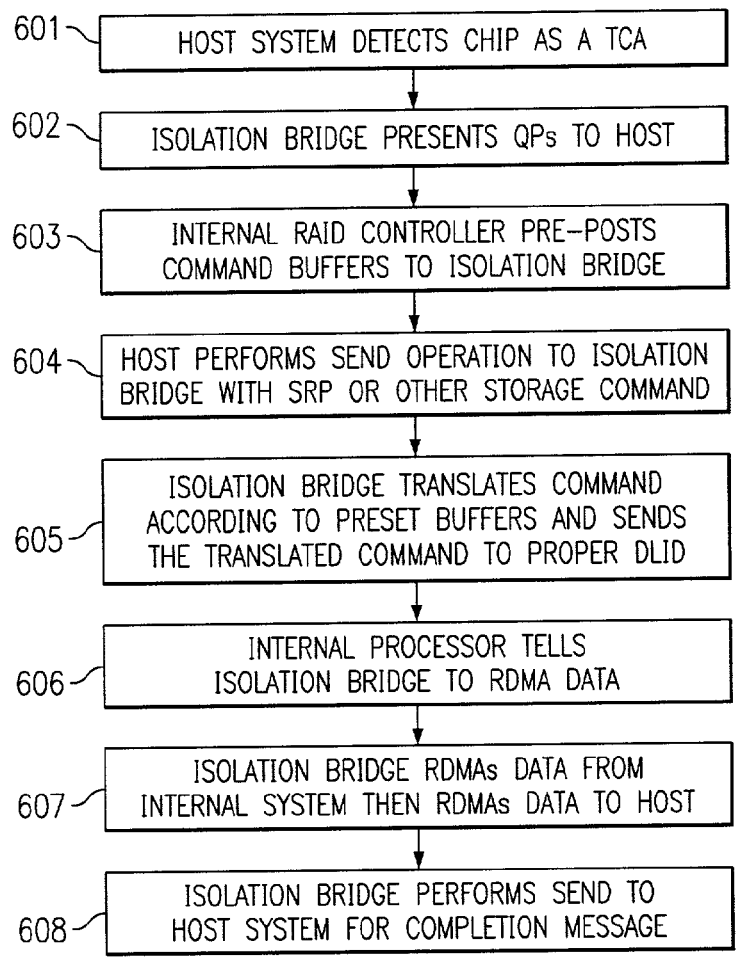
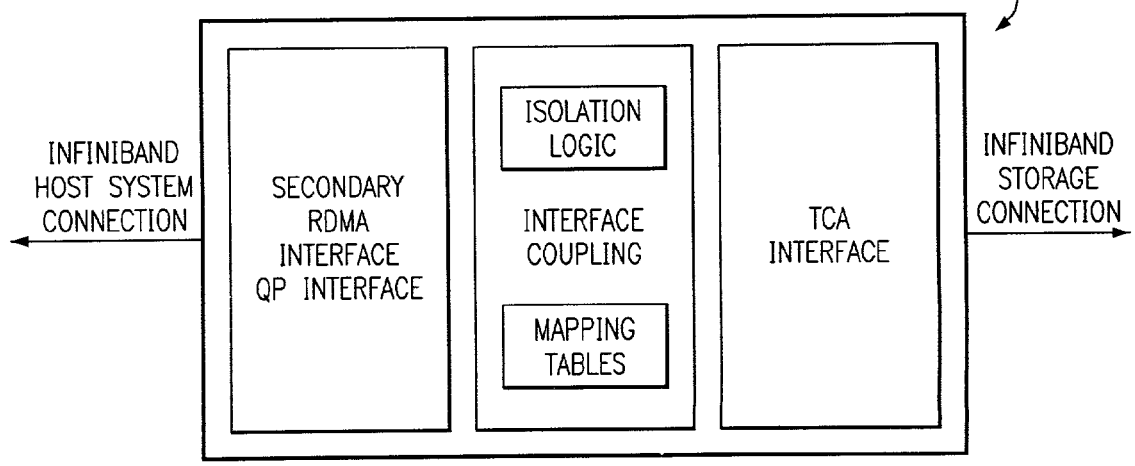

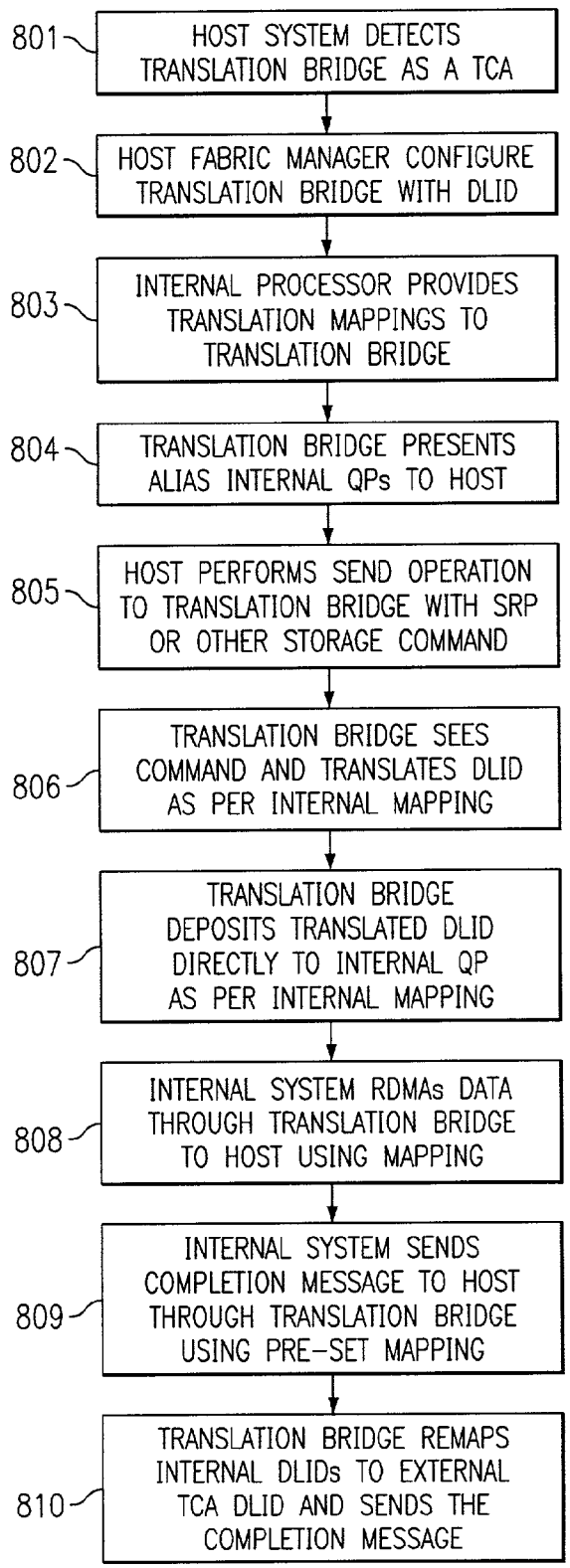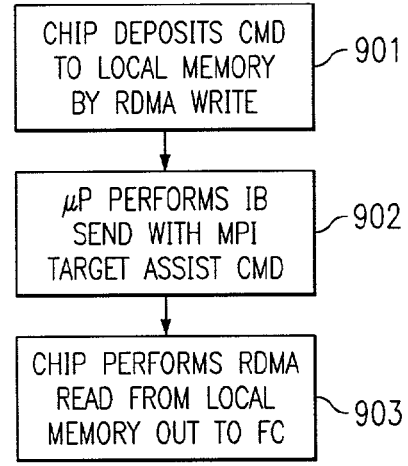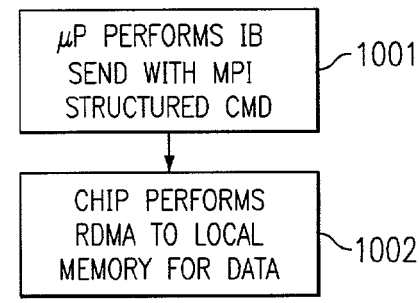

INFINIBAND ISOLATION BRIDGE MERGED WITH ARCHITECTURE OF AN INFINIBAND TRANSLATION BRIDGE

BACKGROUND OF THE INVENTION

1. Technical Field

The present invention relates generally to data processing networks, and more specifically to communication between heterogeneous architectures.

2. Description of the Related Art

As new computer and communication architectures come into use, facilitating communication between dissimilar bus and device architectures becomes more difficult. Part of the problem involves device managers which must keep track of an increasing diversity of devices hooked into various system fabrics. As the number and diversity of devices increases, more resources are expended in an attempt to account for these devices.

Therefore, it would be desirable to have a method for reducing the resources devoted to tracking individual devices in different computer subnets, and allow those subnets to present themselves as single entities to outside device managers during communication and data access.

SUMMARY OF THE INVENTION

The present invention provides a method and system for facilitating communication between computer subnets. One embodiment of the present invention comprises presetting buffers in an internal subnet, wherein the buffers help route external commands to a plurality of devices within the internal subnet. When a command from an external subnet is received by the internal subnet, the command is translated and sent to the proper internal device, as determined by the buffers. The command is then performed by the proper internal device.

In another embodiment of the present invention, translation mapping are established for the internal subnet. When a command is received from an external subnet, the destination address associated with the command is translated to the address of the appropriate internal device, and the command is then sent directly to the internal device, which performs the command. By using either the buffer or translation mappings, the internal subnet appears to be a single device to the external subnet.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 6 depicts a flowchart illustrating the operation of an IB—IB isolation bridge in accordance with the present invention;

FIG. 7 depicts a schematic diagram illustrating the architecture of an IB—IB translation bridge in accordance with the present invention;

FIG. 8 depicts a flowchart illustrating the operation of an IB—IB translation bridge in accordance with the present invention;

FIG. 9 depicts a flowchart illustrating the operation of a front-end IB-FC chip in accordance with the present invention;

FIG. 10 depicts a flowchart illustrating the operation of a back-end IB-FC chip in accordance with the present invention;

DETAILED DESCRIPTION

The description of the preferred embodiment of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

Figure 1:
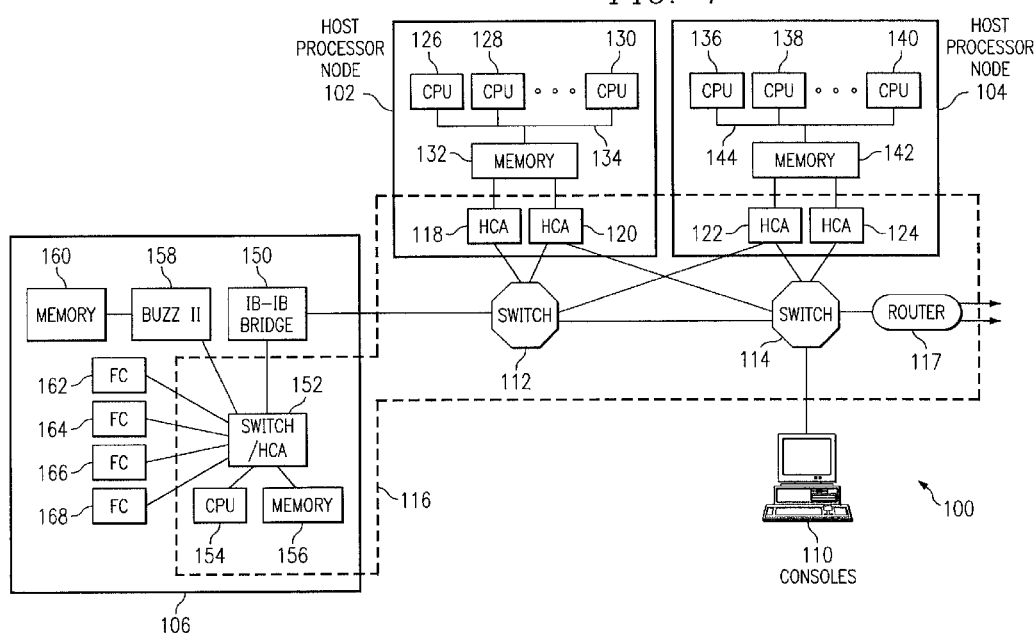
FIG. 1 depicts a diagram of a networked computing system in accordance with a preferred embodiment of the present invention.

With reference now to the figures and in particular with reference to FIG. 1, a diagram of a networked computing system is illustrated in accordance with a preferred embodiment of the present invention. The distributed computer system represented in FIG. 1 takes the form of a system area network (SAN) 100 and is provided merely for illustrative purposes, and the embodiments of the present invention described below can be implemented on computer systems of numerous other types and configurations. For example, computer systems implementing the present invention can range from a small server with one processor and a few input/output (I/O) adapters to massively parallel supercomputer systems with hundreds or thousands of processors and thousands of I/O adapters. Furthermore, the present invention can be implemented in an infrastructure of remote computer systems connected by an internet or intranet.

SAN 100 is a high-bandwidth, low-latency network interconnecting nodes within the distributed computer system. A node is any component attached to one or more links of a network and forming the origin and/or destination of messages within the network. In the depicted example, SAN 100 includes nodes in the form of host processor node 102, host processor node 104, and redundant array independent disk (RAID) controller 106. The nodes illustrated in FIG. 1 are for illustrative purposes only, as SAN 100 can connect any number and any type of independent processor nodes, I/O adapter nodes, and I/O device nodes. Any one of the nodes can function as an endnode, which is herein defined to be a device that originates or finally consumes messages or packets in SAN 100.

In one embodiment of the present invention, an error handling mechanism in distributed computer systems is present in which the error handling mechanism allows for reliable connection or reliable datagram communication between end nodes in a distributed computing system, such as SAN 100.

A message, as used herein, is an application-defined unit of data exchange, which is a primitive unit of communication between cooperating processes. A packet is one unit of data encapsulated by a networking protocol headers and/or trailer. The headers generally provide control and routing information for directing the packets through the SAN. The trailer generally contains control and cyclic redundancy check (CRC) data for ensuring packets are not delivered with corrupted contents.

SAN 100 contains the communications and management infrastructure supporting both I/O and interprocessor communications (IPC) within a distributed computer system. The SAN 100 shown in FIG. 1 includes a switched communications fabric 116, which allows many devices to concurrently transfer data with high-bandwidth and low latency in a secure, remotely managed environment. Endnodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes switch 112, switch 114, and router 117. A switch is a device that connects multiple links together and allows routing of packets from one link to another within a subnet using a small header Destination Local Identifier (DLID) field. A router is a device that connects multiple subnets together and is capable of routing packets from one link in a first subnet to another link in a second subnet using a large header Destination Globally Unique Identifier (DGUID).

In one embodiment, a link is a full duplex channel between any two network fabric elements, such as endnodes, switches, or routers. Example of suitable links include, but are not limited to, copper cables, optical cables, and printed circuit copper traces on backplanes and printed circuit boards.

For reliable service types, endnodes, such as host processor endnodes and I/O adapter endnodes, generate request packets and return acknowledgment packets. Switches and routers pass packets along, from the source to the destination. Except for the variant CRC trailer field which is updated at each stage in the network, switches pass the packets along unmodified. Routers update the variant CRC trailer field and modify other fields in the header as the packet is routed.

In SAN 100 as illustrated in FIG. 1, host processor node 102 and host processor node 104 include at least one channel adapter (CA) to interface to SAN 100. In one embodiment, each channel adapter is an endpoint that implements the channel adapter interface in sufficient detail to source or sink packets transmitted on SAN 100. Host processor node 102 contains channel adapters in the form of host channel adapter 118 and host channel adapter 120. Host processor node 104 contains host channel adapter 122 and host channel adapter 124. Host processing node 102 also includes central processing units 126–130 and a memory 132 interconnected by bus system 134. Host processing node 104 similarly includes central processing units 136–140 and a memory 142 interconnected by a bus system 144.

Host channel adapters 118 and 120 provide a connection to switch 112 while host channel adapters 122 and 124 provide a connection to switches 112 and 114.

In one embodiment, a host channel adapter is implemented in hardware. In this implementation, the host channel adapter hardware offloads much of central processing unit and I/O adapter communication overhead. This hardware implementation of the host channel adapter also permits multiple concurrent communications over a switched network without the traditional overhead associated with communicating protocols. In one embodiment, the host channel adapters and SAN 100 in FIG. 1 provide the I/O and interprocessor communications (IPC) consumers of the distributed computer system with zero processor-copy data transfers without involving the operating system kernel process, and employs hardware to provide reliable, fault tolerant communications.

As indicated in FIG. 1, router 117 is coupled to wide area network (WAN) and/or local area network (LAN) connections to other hosts or other routers. One or more consoles 110 are coupled to switch 114.

In this example, RAID controller 106 in FIG. 1 includes a IB—IB translation/isolation bridge 150, switch/HCA 152, processor 154, memory 156, a Buzz II processor 158 and associated memory 160, and Fiber Channel (FC) connections 162–168 to destination drives. The architecture and function of IB—IB bridge 150 will explained in greater detail below.

SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernel process and directly access network communication hardware, such as host channel adapters, which enable efficient message passing protocols. SAN 100 is suited to current computing models and is a building block for new forms of I/O and computer cluster communication. Further, SAN 100 in FIG. 1 allows I/O adapter nodes to communicate among themselves or communicate with any or all of the processor nodes in a distributed computer system. With an I/O adapter attached to the SAN 100, the resulting I/O adapter node has substantially the same communication capability as any host processor node in SAN 100.

Figure 2:
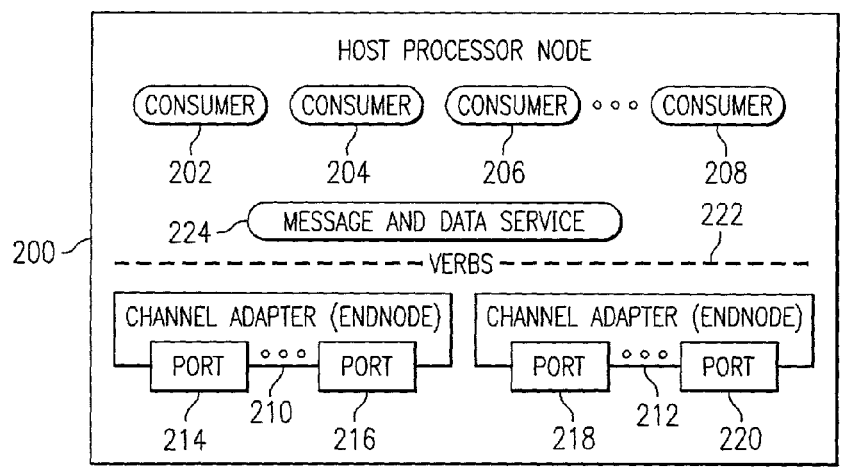
FIG. 2 depicts a functional block diagram of a host processor node in accordance with a preferred embodiment of the present invention.

Turning next to FIG. 2, a functional block diagram of a host processor node is depicted in accordance with a preferred embodiment of the present invention. Host processor node 200 is an example of a host processor node, such as host processor node 102 in FIG. 1. In this example, host processor node 200 shown in FIG. 2 includes a set of consumers 202–208, which are processes executing on host processor node 200. Host processor node 200 also includes channel adapter 210 and channel adapter 212. Channel adapter 210 contains ports 214 and 216 while channel adapter 212 contains ports 218 and 220. Each port connects to a link. The ports can connect to one SAN subnet or multiple SAN subnets, such as SAN 100 in FIG. 1. In these examples, the channel adapters take the form of host channel adapters.

Consumers 202–208 transfer messages to the SAN via the verbs interface 222 and message and data service 224. A verbs interface is essentially an abstract description of the functionality of a host channel adapter. An operating system may expose some or all of the verb functionality through its programming interface. Basically, this interface defines the behavior of the host. Additionally, host processor node 200 includes a message and data service 224, which is a higher level interface than the verb layer and is used to process messages and data received through channel adapter 210 and channel adapter 212. Message and data service 224 provides an interface to consumers 202–208 to process messages and other data.

Figure 3:
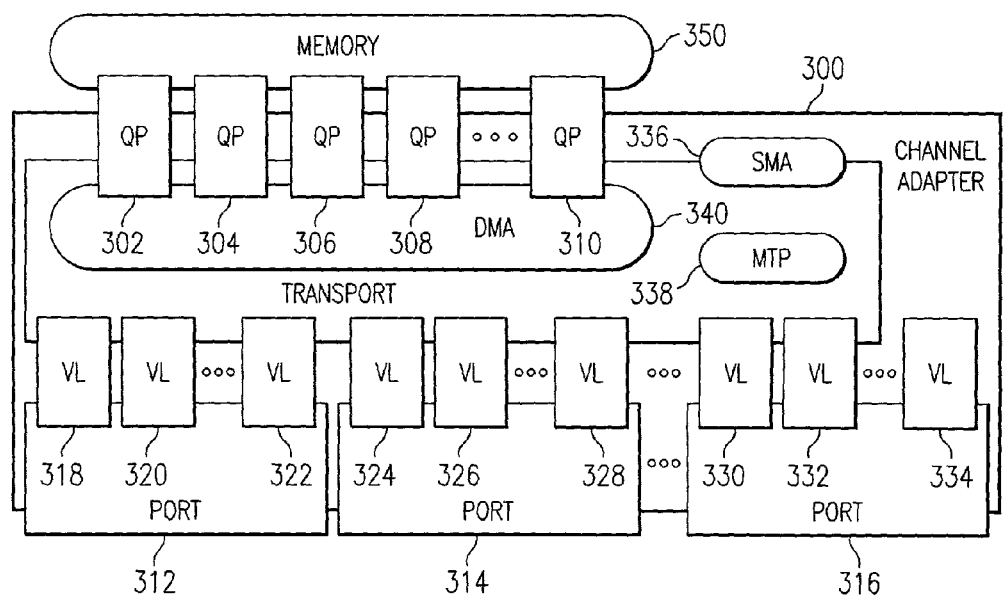
FIG. 3 depicts a diagram of a host channel adapter in accordance with a preferred embodiment of the present invention.

With reference now to FIG. 3, a diagram of a host channel adapter is depicted in accordance with a preferred embodiment of the present invention. Host channel adapter 300 shown in FIG. 3 includes a set of queue pairs (QPs) 302–310, which are used to transfer messages to the host channel adapter ports 312–316. Buffering of data to host channel adapter ports 312–316 is channeled through virtual lanes (VL) 318–334 where each VL has its own flow control. Subnet manager configures channel adapters with the local addresses for each physical port, i.e., the port's LID. Subnet manager agent (SMA) 336 is the entity that communicates with the subnet manager for the purpose of configuring the channel adapter. Memory translation and protection (MTP) 338 is a mechanism that translates virtual addresses to physical addresses and to validate access rights. Direct memory access (DMA) 340 provides for direct memory access operations using memory 350 with respect to queue pairs 302–310.

A single channel adapter, such as the host channel adapter 300 shown in FIG. 3, can support thousands of queue pairs. By contrast, a target channel adapter in an I/O adapter typically supports a much smaller number of queue pairs.

Each queue pair consists of a send work queue (SWQ) and a receive work queue. The send work queue is used to send channel and memory semantic messages. The receive work queue receives channel semantic messages. A consumer calls an operating-system specific programming interface, which is herein referred to as verbs, to place Work Requests onto a Work Queue (WQ).

Figure 4:
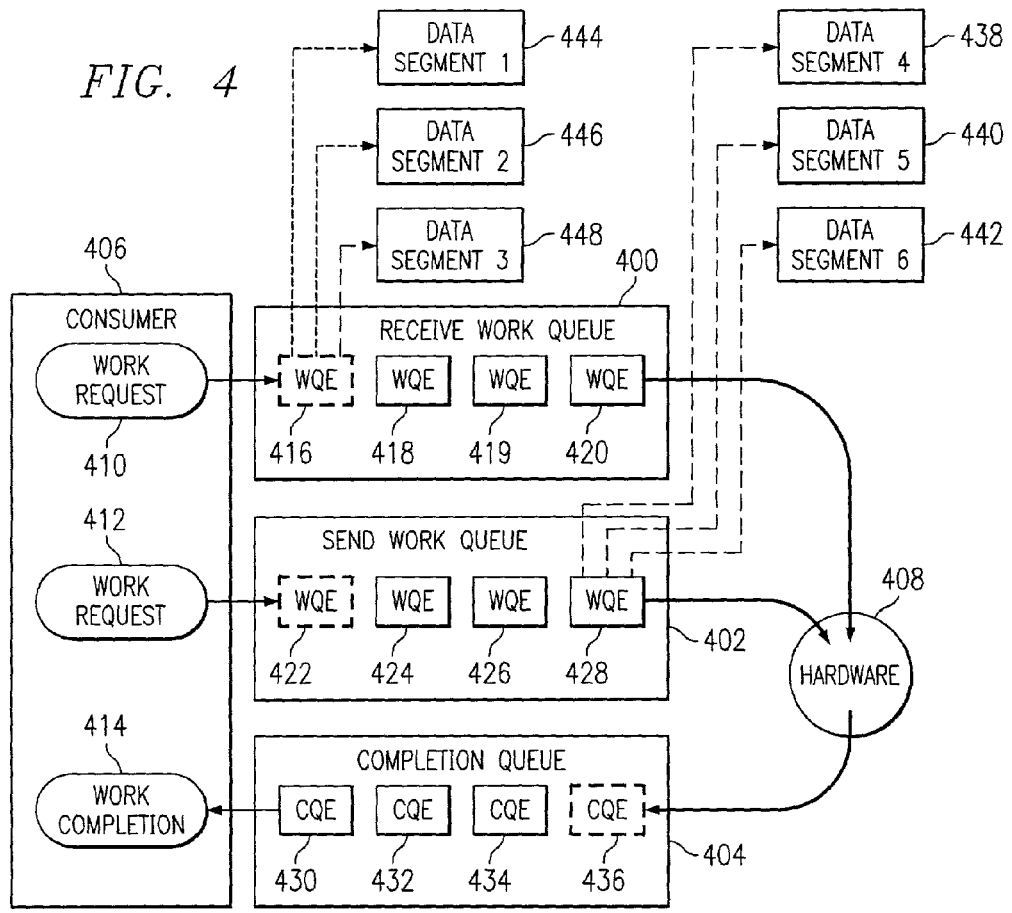
FIG. 4 depicts a diagram illustrating processing of Work Requests in accordance with a preferred embodiment of the present invention.

With reference now to FIG. 4, a diagram illustrating processing of Work Requests is depicted in accordance with a preferred embodiment of the present invention. In FIG. 4, a receive work queue 400, send work queue 402, and completion queue 404 are present for processing requests from and for consumer 406. These requests from consumer 406 are eventually sent to hardware 408. In this example, consumer 406 generates Work Requests 410 and 412 and receives work completion 414. As shown in FIG. 4, Work Requests placed onto a work queue are referred to as Work Queue Elements (WQEs).

Send work queue 402 contains Work Queue Elements (WQEs) 422–428, describing data to be transmitted on the SAN fabric. Receive work queue 400 contains WQEs 416–420, describing where to place incoming channel semantic data from the SAN fabric, such as in Data Segment 1 444, Data Segment 2 446 and Data Segment 3 448. A WQE is processed by hardware 408 in the host channel adapter.

The verbs also provide a mechanism for retrieving completed work from completion queue 404. As shown in FIG. 4, completion queue 404 contains completion queue elements (CQEs) 430–436. Completion queue elements contain information about previously completed Work Queue Elements. Completion queue 404 is used to create a single point of completion notification for multiple queue pairs. A completion queue element is a data structure on a completion queue. This element describes a completed WQE. The completion queue element contains sufficient information to determine the queue pair and specific WQE that completed. A completion queue context is a block of information that contains pointers to, length, and other information needed to manage the individual completion queues.

Example Work Requests supported for the send work queue 402 shown in FIG. 4 are as follows. A send Work Request is a channel semantic operation to push a set of local data segments to the data segments referenced by a remote node's receive WQE. For example, WQE 428 contains references to data segment 4 438, data segment 5 440, and data segment 6 442. Each of the send Work Request's data segments contains a virtually contiguous Memory Region. The virtual addresses used to reference the local data segments are in the address context of the process that created the local queue pair.

The present invention provides a RAID controller which reduces the difficulty of communication between dissimilar bus and device architectures by allowing the internal components of a target system to present themselves as a single entity to an outside device manager. This may be accomplished by means of an InfiniBand-to-InfiniBand (IB) isolation bridge or an IB—IB translation bridge. Because the outside manager only sees a single entity, it does not consume time and resources trying to discover all of the individual components in the target system, which in the present example is RAID controller 106.

Figure 5:
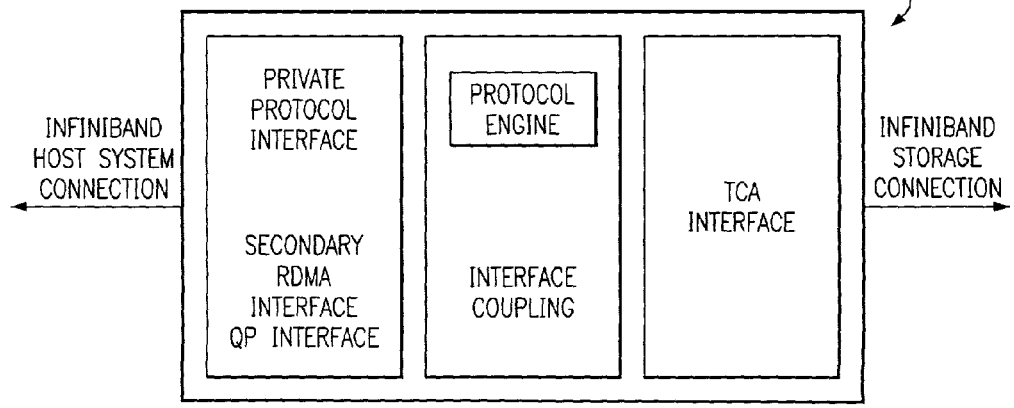
FIG. 5 depicts a schematic diagram illustrating the architecture of an IB—IB isolation bridge in accordance with the present invention.

Referring to FIG. 5 a schematic diagram illustrating the architecture of an IB—IB isolation bridge is depicted in accordance with the present invention. Isolation bridge 500 may be used as the IB bridge 150 in FIG. 1. Isolation bridge 500 allows for the pre-posting of command buffers. Isolation bridge 500 performs command translations on incoming commands from the internal IB system and forwards the new translated commands to the proper DLID among the destination storage drives. Because isolation bridge 500 is capable of QP management and has its own set of QPs, commands from the internal system are addressed to the isolation bridge QPs.

Referring to FIG. 6, a flowchart illustrating the operation of an IB—IB isolation bridge is depicted in accordance with the present invention. The present example will assume the IB architecture illustrated in FIG. 1, with the isolation bridge serving as the IB—IB bridge 150. The isolation bridge 150 presets the destination for RAID access by the outside manager and presets the HCA address which will handle the requests, so that the outside manager only sees the HCA, and not the other devices in the fabric.

The host system 100 detects the isolation bridge 150 as a TCA (step 601). The isolation bridge 150 presents QPs to the host system 100 (Step 602). An internal RAID controller 106 pre-posts command buffers to the isolation bridge 150 (step 603). The host 100 then performs a Send operation to the isolation bridge 150 with a SCSI RDMA Request (SRP) or other storage command (step 604). The isolation bridge 150 translates the command according to the preset command buffers and sends the new translated command to the proper DLID (e.g., 164) (step 605). The internal processor 154 tells the isolation bridge 150 to RDMA the data (step 606). The isolation bridge 150 RDMAs the data from the internal system 106 to the host system 100 (step 607). The isolation bridge 150 then performs a Send to the host system 100 for a completion message and confirms that the internal processor operation was completed (step 608).

Referring to FIG. 7, a schematic diagram illustrating the architecture of an IB—IB translation bridge is depicted in accordance with the present invention. Unlike isolation bridge 500, translation bridge 700 does not perform command translations, but instead performs DLID translations and passes commands directly to the RAID HCA (e.g., HCA 152). This is accomplished by using mapping tables to feed commands to the proper HCA QPs.

Referring to FIG. 8, a flowchart illustrating the operation of an IB—IB translation bridge is depicted in accordance with the present invention. The translation bridge dynamically maps requests to the appropriate destination, while presenting the internal subnet as a single entity to the outside manager. As in FIG. 6, FIG. 8 will assume the architecture of FIG. 1, with the translation bridge serving as IB—IB bridge 150.

The host system 100 detects the translation bridge 150 as a TCA (step 801). The fabric manager (FM) of host system 100 configures translation bridge 150 with a DLID (step 802). During this process, the internal IB components of RAID controller 106 are never seen by the host system 100. The internal processor 154 then provides translation mappings to the translation bridge 150 (step 803). The translation bridge 150 presents controller internal QPs to the host 100 through "aliasing", so that the host system does not see the internal QPs directly (step 804). The host system 100 performs a Send operation to the translation bridge 150 with a SRP or other storage command (step 805). The translation bridge 150 sees the command and translates the DLID as per the mappings (step 806). The translation bridge 150 then deposits the translated DLID to internal QPs as per the mapping (step 807). The internal system 106, using the mapping, RDMAs the data through the translation bridge 150 to the host 100 (step 808). The internal system 106 then uses the pre-set mapping to send a completion message to the host system 100 through the translation bridge 150 (step 809). The translation bridge 150 remaps the internal DLIDs to external TCA DLIDs, and sends the completion message to the host system 100 (step 810). Thus, the host system 100 always thinks it is a TCA DLID that is responding, not the internal system 106.

Referring to FIG. 9, a flowchart illustrating the operation of a front-end IB-FC chip is depicted in accordance with the present invention. Referring back to FIG. 1, the front-end chip is the component in bridge 150 that hooks into the host system 100. The Chip (in bridge 150) deposits a command (CMD) to local memory 156 by means of a RDMA Write command (step 901). The microprocessor 154 performs an IB Send with a Message Passing Interface (MPI) Target Assist CMD (step 902). The chip then performs a RDMA Read from the local memory 156 out to the FC (e.g., FC 162) (step 903).

Referring to FIG. 10, a flowchart illustrating the operation of a back-end IB-FC chip is depicted in accordance with the present invention. The back-end chip is the component of bridge 150 which the internal storage drives 162–168 hook into and is the initiator to the target drives. The microprocessor 154 performs an IB Send with a MPI Structured CMD (step 1001). The chip then performs a RDMA to local memory 156 for data (step 1002).

Figure 11:
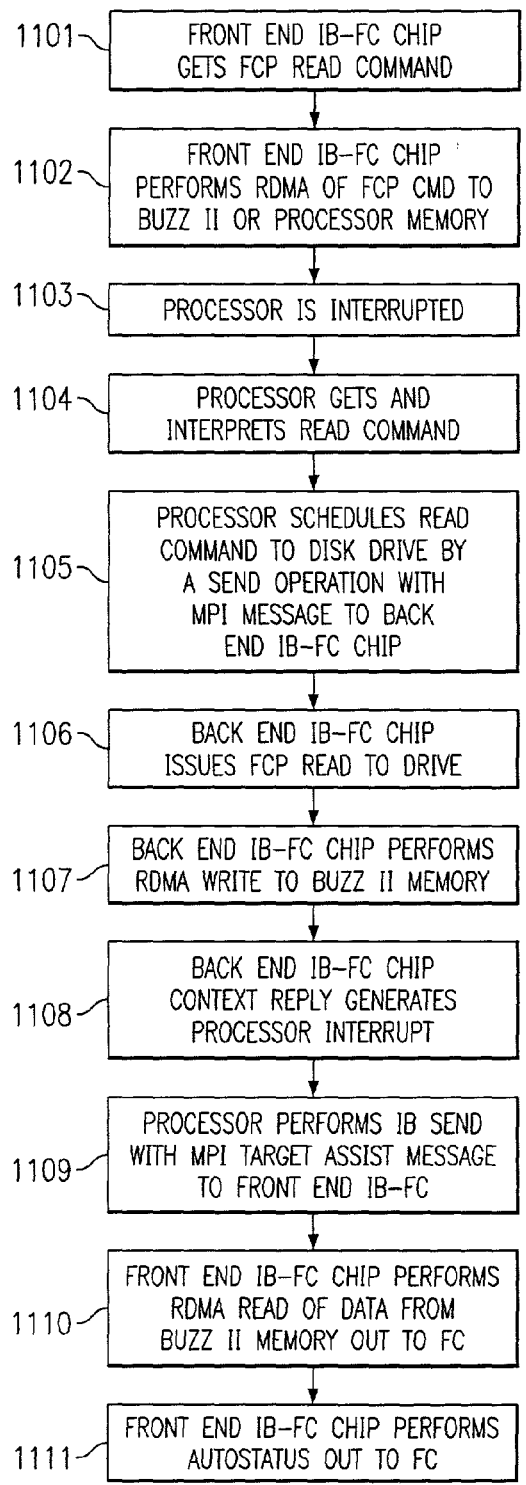
FIG. 11 depicts a flowchart illustrating a host Read command to a RAID in accordance with the present invention.

Referring to FIG. 11, a flowchart illustrating a host Read command to a RAID is depicted in accordance with the present invention. The font-end chip (in bridge 150) gets a FCP Read command (step 1101) and performs a RDMA of FC Protocol (FCP) CMD to Buzz II 158 or processor memory 156 (step 1102). (Buzz II refers to the Buzz II class of processor, which is being used for the present example.) The processor 154 is interrupted (step 1103) and gets and interprets the Read command (step 1104). The processor 154 then schedules the Read command to the disk drive by a Send operation with a MPI message to the back-end chip (also in bridge 150) (step 1105). The back-end chip issues a FCP Read command to the disk drive (step 1106), and then performs a RDMA Write to Buzz II memory 160 (step 1107). The back-end chip Context Reply generates a processor interrupt (step 1108). The processor 154 performs an IB Send with a MPI Target Assist message to the front-end chip (step 1109). The front-end chip performs RDMA Read of data from Buzz II memory 160 out to the FC (e.g., FC 166) (step 1110). The front-end chip then performs an AutoStatus out to the FC (step 1111).

Figure 12:
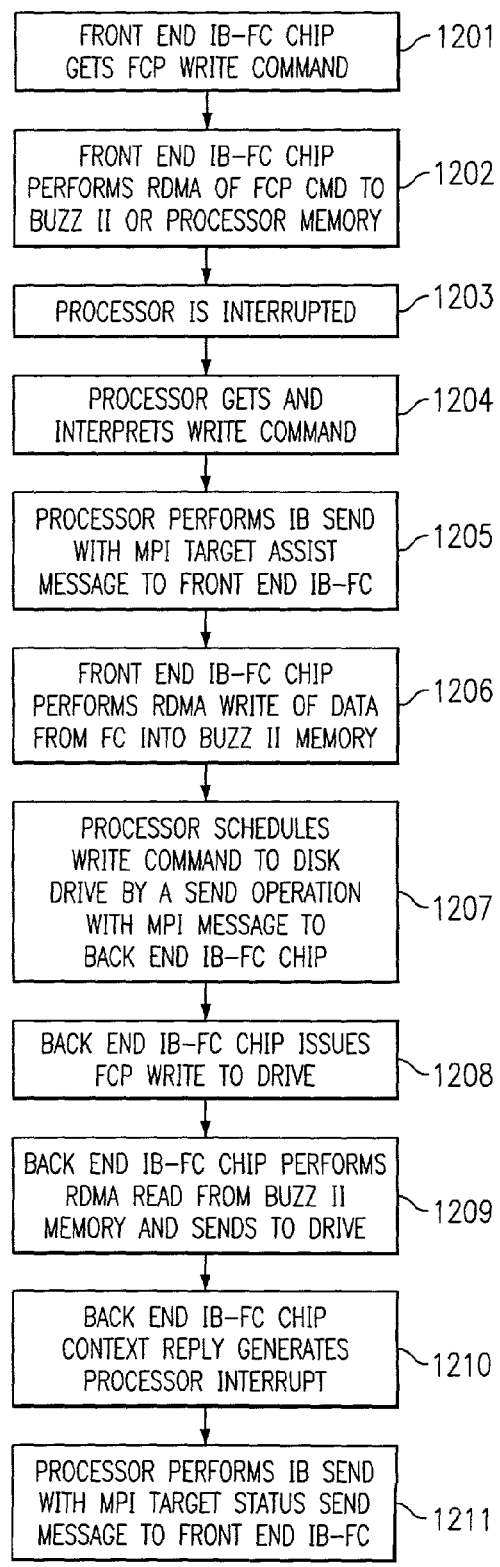
FIG. 12 depicts a flowchart illustrating a host Write command to a RAID in accordance with the present invention.

Referring to FIG. 12, a flowchart illustrating a host Write command to a RAID is depicted in accordance with the present invention. The front-end chip (in bridge 150) gets a FCP Write command (step 1201) and performs a RDMA of FCP CMD to Buzz II 158 or Processor memory 156 (step 1202). The processor 154 is interrupted (step 1203) and gets and interprets the Write command (step 1204). The processor 154 performs an IB Send with MPI Target Assist message to the front-end chip (step 1205). The front-end chip performs a RDMA Write of data from the FC into Buzz II memory 160 (step 1206). The processor 154 then schedules the Write command to the disk drive by a Send operation with MPI message to the back-end chip (also in bridge 150) (step 1207). The back-end chip issues the FCP Write to the disk drive (step 1208). The back-end chip then performs a RDMA Read from Buzz II memory 160 and Sends to the disk drive (step 1209). The back-end chip Context Reply generates a processor interrupt (step 1210). The processor 154 then performs an IB Send with MPI Target Status Send message to the front-end chip (step 1211).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for facilitating communication between an InfiniBand host system and a device with an internal InfiniBand bus structure, the method comprising:

pre-posting command buffers to an InfiniBand isolation bridge, wherein the buffers contain external small computer system interface commands;

receiving a command from the InfiniBand host system;

translating the command from an InfiniBand host system command to a command for the device with an internal InfiniBand bus structure to form a translated command, and sending the translated command to the device with an internal InfiniBand bus structure and performing the translated command.

2. The method according to claim 1, further comprising: sending a command completed message to the InfiniBand host system, wherein the message appears to originate from the InfiniBand isolation bridge.

3. The method according to claim 1, wherein the command is a RAID write command, and the method is performed in an endnode that originates and finally consumes messages in a system area network.

4. The method according to claim 1, wherein the method is performed in an endnode that originates and finally consumes messages in a system area network.

5. A system for facilitating communication between an InfiniBand host system and a device with an internal InfiniBand bus structure, the system comprising:

a register for pre-posting command buffers to an InfiniBand isolation bridge, wherein the buffers contain external small computer system interface commands;

a receiver for receiving a command from the InfiniBand host system;

a translating component for translating the command from an InfiniBand host system command to a command for the device with an internal InfiniBand bus structure to form a translated command, and sending the translated command to the device with an internal InfiniBand bus structure a processing component for performing the translated command.

6. The system according to claim 5, further comprising:

a sending component for sending a command completed message to the InfiniBand host system, wherein the message appears to originate from the InfiniBand isolation bridge.

7. The system according to claim 5, wherein the system is an endnode that originates and finally consumes messages in a system area network.

8. The system according to claim 5, wherein the command is a RAID read command, and the system is an endnode that originates and finally consumes messages in a system area network.

\* \* \* \* \*